United States Patent [19]

Patchen, II

[11] Patent Number: 4,513,695
[45] Date of Patent: Apr. 30, 1985

[54] INTERCOOLER BYPASS RETURN IN AN INTERNAL COMBUSTION ENGINE

[75] Inventor: Paul Patchen, II, Homewood, Ill.

[73] Assignee: Allis-Chalmers Corporation, Milwaukee, Wis.

[21] Appl. No.: 521,992

[22] Filed: Aug. 11, 1983

[51] Int. Cl.³ .............................................. F01P 3/12
[52] U.S. Cl. ............................. 123/41.1; 123/41.31; 123/563
[58] Field of Search .................... 123/563, 41.3, 41.33, 123/41.08–41.1; 60/599

[56] References Cited

U.S. PATENT DOCUMENTS

| | | | |
|---|---|---|---|
| 3,397,684 | 8/1968 | Scherenberg | 60/599 |
| 3,881,455 | 5/1975 | Belsanti | 123/563 |
| 4,269,158 | 5/1981 | Berti | 123/563 |
| 4,317,439 | 3/1982 | Emmerling | 123/563 |

Primary Examiner—William A. Cuchlinski, Jr.
Attorney, Agent, or Firm—Charles L. Schwab

[57] ABSTRACT

An intercooler coolant circuit and an engine coolant circuit in an engine cooling system wherein the engine coolant bypass passage operates continuously as the intercooler coolant return passage.

5 Claims, 4 Drawing Figures

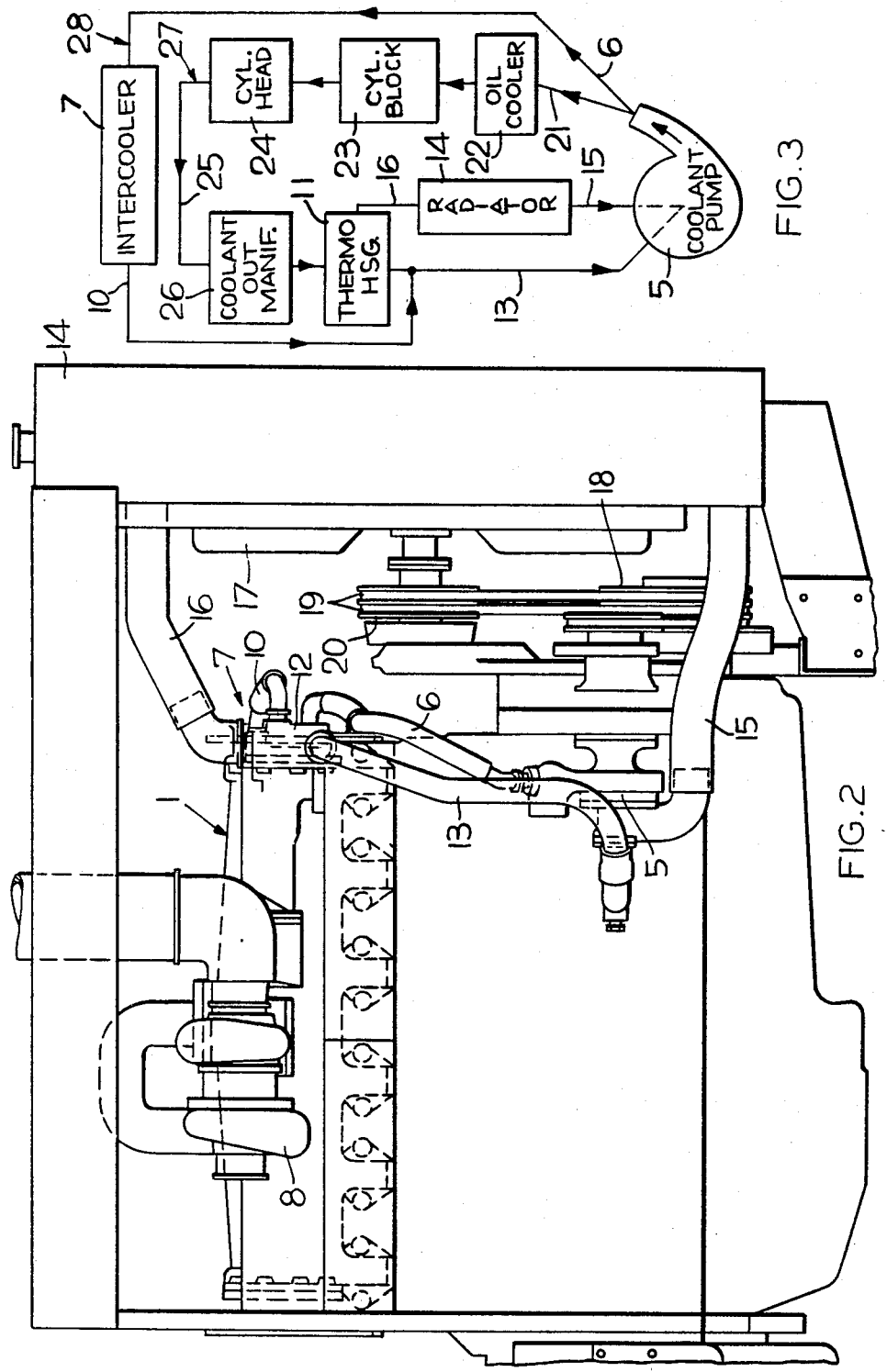

INTERCOOLER BYPASS RETURN IN AN INTERNAL COMBUSTION ENGINE

This invention relates to a cooling system for an internal combustion engine and the intercooler on the engine and, more particularly, to an intercooler coolant circuit having a return passage formed by the engine coolant circuit bypass passage return normally bypassing the radiator when the engine is cold and operating continuously as the return passage for the intercooler coolant circuit.

An internal combustion engine cooling circuit is provided with coolant passages in the engine for cooling the engine connected alternately to a return passage bypassing the radiator and returning the coolant fluid to the coolant pump when the engine is cold. A thermostat is provided in the engine to selectively modulate the coolant fluid through the radiator when the engine is at normal operating temperatures and for bypassing the radiator when the engine is cold. Though the bypass passage is exclusively used when the engine is cold or warming up in the conventional engine, the return bypass passage for the engine coolant circuit is modulated when at normal operating temperature. Conventionally, the return fluid from the intercooler may flow through the radiator with return fluid from the engine which is being cooled and then returned to the coolant pump. In this manner, the return coolant from the intercooler enters the engine coolant circuit upstream of the thermostat and accordingly is mixed with a coolant fluid from the engine and is selectively modulated through the bypass passage to the coolant pump or through the radiator depending on the temperature of the coolant.

Improved performance of the intercooler can be achieved by connecting the return flow passage to the bypass passage downstream from the thermostat. Although the engine coolant and the intercooler coolant are mixed during the warm-up period, cooling of the coolant is not needed during the warm-up period. When the engine warms up and the thermostat modulates the engine coolant through the radiator, and then the return flow from the intercooler is the primary fluid flowing through the bypass conduit to the coolant pump. This improves the flow rate and the performance of the intercooler and simplifies the cooling system since the bypass circuit operates as a return flow passage for the intercooler. An additional return passage is not needed. The efficiency of the intercooler is increased by not running the fluid through the radiator with the engine coolant.

The Bentz et al patent, U.S. Pat. No. 3,752,132, shows an attempt to improve the intercooler efficiency in which two circuits are used; one circuit for the engine cooling system, and another circuit for the intercooler. The applicant has provided for one radiator for cooling the coolant in both the intercooler cooling circuit and the engine cooling circuit to provide better efficiency for the intercooler and simplifies the cooling circuits and the overall cooling system.

It is an object of this invention to provide an engine cooling system with an intercooler cooling circuit connected through the bypass return of the engine cooling circuit to increase the coolant flow rate through the intercooler for better effficiency of the intercooler.

It is another object of this invention to provide an engine cooling system with a single coolant pump and a single radiator for cooling the engine and the intercooler. The return flow for the intercooler is connected downstream from the thermostat to provide continuous flow of the coolant fluid through the bypass return passage to the coolant pump. The thermostat diverts flow to the bypass return passage during the warm-up period and through the radiator during normal operation of the engine cooling circuit to improve the efficiency of the intercooler.

It is a further object of this invention to provide an engine cooling system including an engine cooling circuit having a single coolant pump and a single radiator. Return flow from the engine system is selectively controlled by a thermostat diverting flow through a bypass passage to the coolant pump during engine warm-up through the radiator during normal operations. The intercooler return is provided by connecting the return passage of the intercooler downstream of the thermostat utilizing the bypass passage in the engine coolant circuit for continuous return flow of the intercooler to improve the efficiency of the intercooler.

The objects of this invention are accomplished by providing an engine cooling system including an engine cooling circuit having a coolant pump, and engine cooling passages in the engine which flow through a thermostat, which alternately diverts return flow through the radiator or through a bypass passage. An intercooler cooling circuit includes the same coolant pump and radiator and passage leading to the intercooler with a return flow from the intercooler utilizing the bypass passage in the engine cooling circuit as a return flow passage for the intercooler to increase the flow rate through the intercooler and overall efficiency of the intercooler.

Referring to the drawings, the preferred embodiments of this invention are illustrated.

FIG. 2 is a side elevation view of the internal combustion engine showing the engine cooling circuit and the intercooler cooling circuit;

Figures 1, 4:
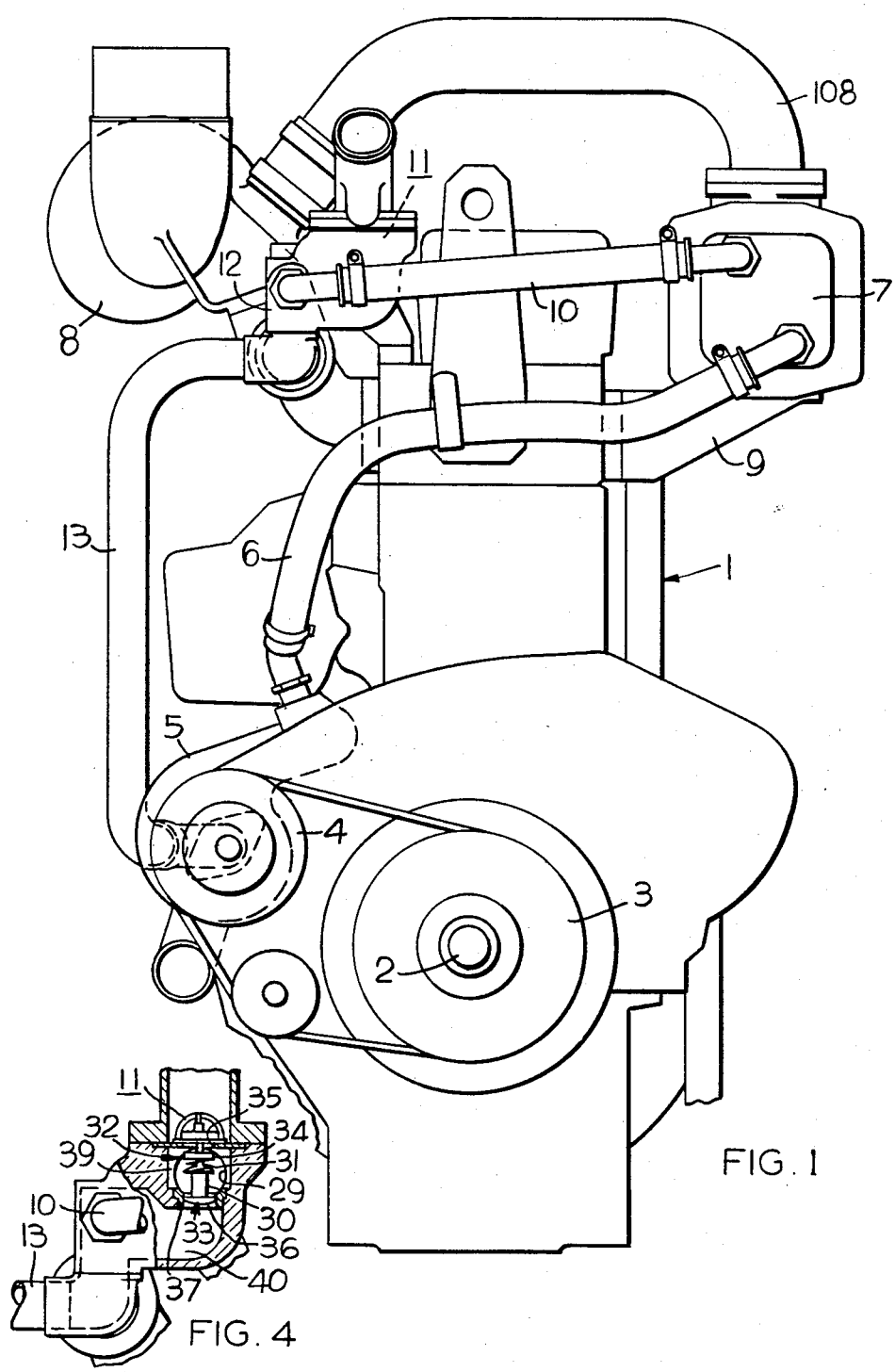
FIG. 1 illustrates an end view of an internal combustion engine with the engine cooling circuit and the intercooler cooling circuit.

FIG. 3 is a schematic diagram showing the engine cooling circuit and the intercooler cooling circuit in the engine cooling system; and FIG. 4 is a cross-section view of the thermostatically controlled valve directing fluid flow through the radiator or through the bypass passage for the engine coolant circuit and the connection for the return flow of the intercooler cooling circuit to the bypass passage in the engine cooling circuit.

Referring to the drawings, FIG. 1 shows an engine 1 with the end of a crankshaft 2 driving the pulley 3 which in turn drives the pulley 4 of the coolant pump 5. The coolant pump 5 circulates coolant through the engine cooling circuit and the intercooler cooling circuit as illustrated in FIG. 3. The intercooler cooling circuit includes the conduit 6 which supplies coolant fluid to the intercooler 7. The supercharger 8 is connected to the intercooler 7 through air pipe 108 for supplying air to the intake manifold 9 on the engine. The return conduit 10 from the intercooler 7 is connected to the housing 12 of the thermostatic valve 11 on the downstream side of the thermostat. The bypass conduit 13 is also connected to the housing 12 on the downstream side of the thermostatic valve 11 and is connected to the inlet side of the coolant pump 5. The engine cooling circuit also uses the same coolant pump 5 and the coolant is pumped through passages in the engine and then to the thermostatic valve 11. The thermostatic valve diverts the flow of coolant through the bypass circuit 13 to the pump 5 when the engine is cold and during the warm-up period. When the engine is operating normally, the thermostatic valve 11 diverts the flow of coolant through the radiator 14 and then is returned from the radiator through the conduit 15 to the coolant pump 5. The thermostatic valve 11 is connected through the conduit 16 to the upper part of the radiator.

Referring to FIG. 2, the engine 1 drives the fan 17 through the pulley 18, belts 19 and fan pulley 20 to draw air through the radiator for cooling the engine.

Referring to FIG. 3, the intercooler cooling circuit includes the pump 5 forcing fluid through the conduit 6 to the intercooler 7. Return flow of the coolant from the intercooler flows through the conduit 10 to the downstream side of thermostatic valve 11 to the bypass conduit 13 to the coolant pump 5. Coolant pump 5 also supplies pressurized fluid to the conduit 21 leading to the oil cooler 22, cylinder block 23 and cylinder head 24 all in series. The conduit 25 transmits coolant to the output coolant manifold 26 on the upstream side of the thermostatic valve 11. Thermostatic valve 11 diverts fluid through the bypass conduit 13 or the radiator 14 depending on the temperature of the coolant. During normal operation, all of the coolant in the engine cooling circuit 27 flows through the radiator. The intercooler cooling circuit 28 returns fluid through the bypass conduit 13 whether the engine is cold or in the warm-up period or running normally.

FIG. 4 is a cross-section view of the thermostatic valve. The thermostatic valve 11 is provided with inlet passage 29 leading from the coolant passages in the engine. The bypass conduit 13 leads from the thermostatic valve to the coolant pump 5. The intercooler cross passage 10 leads to the thermostatic valve 11. The thermostatic valve 11 includes a valve member 30 having a thermostatic element 31 biasing the valve element 30 to either close the radiator valve 32 and open the bypass valve 13 or vice-versa, depending on the temperature of the coolant in the valve chamber 39. The radiator valve element 34 engages a valve seat 35 when the radiator valve is closed. Simultaneously, the bypass valve element 36 is moved to the upper position and no longer engages the bypass valve seat 37. The valve element 30 moves upwardly to close the radiator valve 32 when the coolant is cold. When the coolant warms up, the valve element moves downwardly to open the radiator valve 32 and close the bypass valve 33. Return flow from the intercooler flowing through the conduit 10 and the bypass conduit 13 is returned to the coolant pump 5 regardless of the temperature of the coolant in the valve chamber 39.

The operation of the device will be described in the following paragraphs.

When the engine is cold, the thermostatic valve 11 is positioned so that the radiator valve is closed and the bypass valve is open. Under these circumstances, the coolant flowing through the engine flows through the bypass conduit 13 to the coolant pump 5. During the warm-up period, the valve remains essentially in the same position and the coolant circulates through the bypass conduit and the coolant is not cooled in the radiator. As the engine gradually warms up, the coolant is then diverted through the radiator to cool the coolant before it is returned to the coolant pump. Diversion of the fluid from the bypass conduit 13 to the radiator is automatically controlled by the thermostatic valve 11 responsive to temperature change in the valve compartment 39.

Coolant fluid for the intercooler is pumped through the same coolant pump 5 which circulates the coolant through the intercooler 7 and is returned through the return conduit 10 to the bypass chamber 40 and the bypass conduit 13 to return again to the coolant pump. This operation remains the same whether the thermostatic valve is open or closed because the return flow from the intercooler is connected downstream of the thermostatic valve. Accordingly, a single pump 5 is used to circulate the coolant through the intercooler as well as the engine. The radiator provides cooling of the coolant when the coolant warms up to a predetermined temperature. The coolant is circulated through the radiator to cool the coolant which flows through the engine and the intercooler. Circulating the coolant through the bypass return 13 increases the flow rate and provides greater efficiency of cooling in the intercooler and simplifies the circuit for the intercooler cooling circuit.

The embodiments of this invention in which an exclusive property or privilege is claimed are defined as follows:

1. An engine cooling system on an internal combustion engine comprising, an internal combustion engine having the engine cooling circuit with coolant passages in said engine, a coolant pump circulating coolant in said engine cooling circuit, alternate return passages from the engine coolant passages including a bypass return conduit and a radiator for returning cooling fluid to said coolant pump, a thermostatic valve connected upstream of said bypass return conduit and said radiator selectively and alternatively diverting coolant through said bypass return conduit and said radiator responsive to the temperature of the coolant in said thermostatic valve, said thermostatic valve including a bypass chamber connected to said bypass return conduit, an intercooler cooling circuit including an intercooler, a coolant supply conduit connected to said coolant pump to said intercooler, an intercooler return conduit connected between said intercooler and said bypass chamber to return coolant from said intercooler to said coolant pump to thereby provide an improved flow rate and efficiency of said intercooler in said engine cooling system.

2. An engine cooling system on an internal combustion engine as set forth in claim 1 wherein said bypass return conduit provides continuous flow from said intercooler to said coolant pump.

3. An engine cooling system on an internal combustion engine as set forth in claim 1 wherein said engine includes a supercharger for supplying air to said intercooler and an intake manifold of said engine.

4. An engine cooling system on an internal combustion engine as set forth in claim 1 wherein said conduit means to and from said intercooler define external conduits on said engine.

5. An engine cooling system on an internal combustion engine comprising, an internal combustion engine having the engine cooling circuit with coolant passages in said engine, a coolant pump circulating coolant in said engine cooling circuit, alternate return passages from the engine coolant passages including a bypass return conduit and a radiator for returning cooling fluid to said coolant pump, a thermostatic valve connected upstream of said bypass return conduit and said radiator selectively and alternatively diverting coolant through said bypass return conduit and said radiator responsive to the temperature of the coolant in said thermostatic valve, said thermostatic valve including a valve between the engine cooling passages and said radiator, a valve between said engine cooling passages and said bypass return conduct and means interconnecting said radiator valve and said bypass valve for selectively and alternatively opening said valves to divert fluid flow through said radiator and said bypass return conduit, an intercooler cooling circuit including an intercooler, a coolant supply conduit connected to said coolant pump to said intercooler, an intercooler return conduit connected between said intercooler and said bypass return conduit in said engine cooling circuit to return coolant from said intercooler to said coolant pump to thereby provide an improved flow rate and efficiency of said intercooler in said engine cooling system.

* * * * *